(12) United States Patent
Gilliland et al.

(10) Patent No.: US 11,493,121 B2
(45) Date of Patent: Nov. 8, 2022

(54) GEAR SYSTEMS HAVING BEARING FLEXURE MOUNTED THRUST BEARINGS

(71) Applicant: Textron Innovations Inc., Providence, RI (US)

(72) Inventors: Colton James Gilliland, Northlake, TX (US); Russell Lee Mueller, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 172 days.

(21) Appl. No.: 17/171,206

(22) Filed: Feb. 9, 2021

(65) Prior Publication Data

US 2022/0252144 A1    Aug. 11, 2022

(51) Int. Cl.

| F16H 57/021 | (2012.01) |
|---|---|
| F16H 57/038 | (2012.01) |
| B64C 27/12 | (2006.01) |
| B64D 27/02 | (2006.01) |
| F16C 19/18 | (2006.01) |
| B64C 29/00 | (2006.01) |
| F16H 57/02 | (2012.01) |

(52) U.S. Cl.
CPC ........... F16H 57/021 (2013.01); B64C 27/12 (2013.01); B64C 29/0033 (2013.01); B64D 27/02 (2013.01); F16C 19/18 (2013.01); F16H 57/038 (2013.01); F16C 2326/43 (2013.01); F16H 2057/02043 (2013.01)

(58) Field of Classification Search
CPC .............. F16H 57/021; F16H 57/038; F16H 2057/02043; B64C 27/12; B64C 29/0033; B64D 27/02; F16C 19/18; F16C 2326/43; F16C 27/04; F16C 27/066; F16C 35/04; F16C 35/073; F16C 19/181; F16C 19/183
See application file for complete search history.

(56) References Cited

U.S. PATENT DOCUMENTS

| 8,322,038 | B1 * | 12/2012 | Heidari ................. F01D 25/164 |
|---|---|---|---|
|  |  |  | 29/898.07 |
| 9,868,542 | B2 * | 1/2018 | Williams ................. B64C 3/32 |
| 9,869,206 | B2 * | 1/2018 | Von Berg ............... F16C 27/045 |
| 9,909,451 | B2 * | 3/2018 | Carter ................... F16C 35/073 |
| 10,250,098 | B2 | 4/2019 | Leiber et al. |
| 10,274,017 | B2 * | 4/2019 | Ganiger ................ F04D 29/321 |
| 11,193,390 | B2 | 12/2021 | Ganiger et al. |

(Continued)

*Primary Examiner* — Thomas C Diaz
(74) *Attorney, Agent, or Firm* — Lawrence Youst PLLC

(57) ABSTRACT

A gear system includes a gear assembly having a shaft that is at least partially disposed within a housing of the gear system. A thrust bearing has inner and outer races with the outer race coupled to the housing. A bearing flexure is disposed between the inner race of the thrust bearing and the shaft. The bearing flexure includes a cylindrical cage having at least one shaft journal ring and a plurality of circumferentially distributed axially extending fingers coupled thereto with the shaft journal ring coupled to the shaft. A cylindrical bearing journal has inner and outer surfaces with the outer surface coupled to the inner race of the thrust bearing. Each of a plurality of circumferentially distributed radially extending struts extends between one of the fingers and the inner surface of the cylindrical bearing journal. The bearing flexure has an axial stiffness that is greater than its radial stiffness.

20 Claims, 8 Drawing Sheets

(56) References Cited

U.S. PATENT DOCUMENTS

| | | | |
|---|---|---|---|
| 2004/0168876 A1* | 9/2004 | Tully | F16D 41/206 |
| | | | 192/75 |
| 2005/0058378 A1 | 3/2005 | Goss et al. | |
| 2014/0314358 A1 | 10/2014 | Seubert et al. | |
| 2018/0112672 A1* | 4/2018 | Ganiger | F16C 19/06 |

* cited by examiner

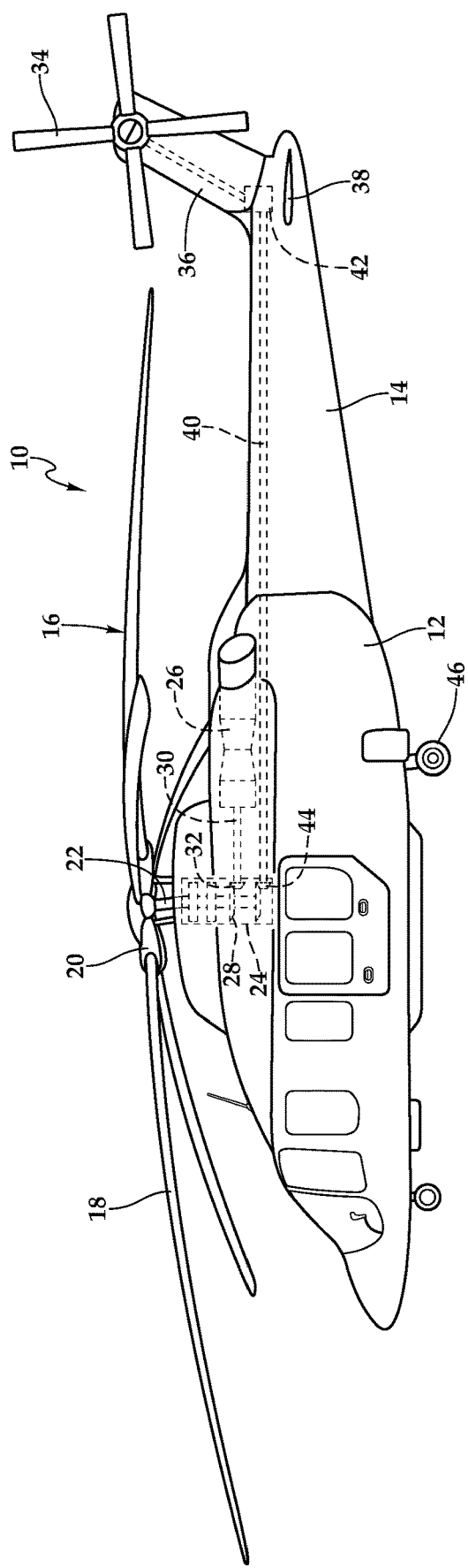
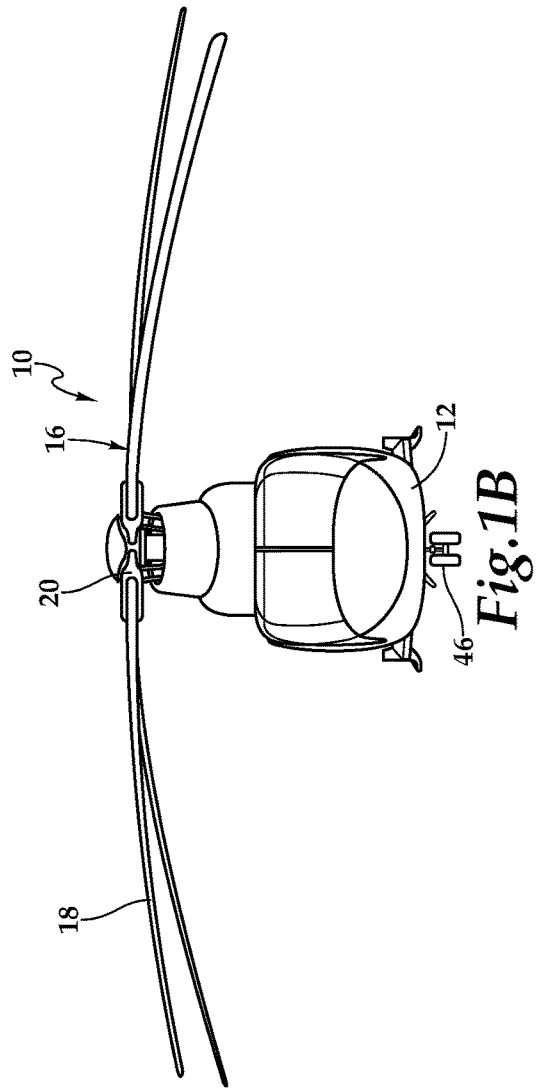
Fig.1A
Fig.1B

GEAR SYSTEMS HAVING BEARING FLEXURE MOUNTED THRUST BEARINGS

TECHNICAL FIELD OF THE DISCLOSURE

The present disclosure relates, in general, to gear systems for use on rotorcraft and, in particular, to gear systems having gear assemblies including thrust bearings that are radially outwardly mounted on bearing flexures for decoupling radial loads and reducing the operating temperature of the thrust bearings during high speed operations.

BACKGROUND

Certain rotorcraft are capable of taking off, hovering and landing vertically. One such rotorcraft is a helicopter, which has one or more main rotors that provide lift and thrust to the aircraft. The main rotors not only enable hovering and vertical takeoff and landing, but also enable forward, backward and lateral flight. These attributes make helicopters highly versatile for use in congested, isolated or remote areas. Another such rotorcraft is a tiltrotor aircraft, which has a set of proprotors that can change their plane of rotation based on the operation being performed. Tiltrotor aircraft typically have a pair of nacelles mounted near the outboard ends of a fixed wing with each nacelle housing a power system that drives the respective proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Torque and rotational energy are typically provided to the rotors or proprotors of such rotorcraft from a powertrain that includes one or more engines and one or more gear systems. It has been found, however, that thrust bearings operably associated with the various gear assemblies in the powertrain should be decoupled from certain radials loads. In addition, it has been found, that such thrust bearings can generate a significant amount of heat, particularly in high speed operations, which must be dissipated to prevent adverse bearing performance. Therefore, a need has arisen for improved gear systems that decouple radial loads from the thrust bearings and have sufficient cooling of the thrust bearings to enable high speed operations.

SUMMARY

In a first aspect, the present disclosure is directed to a gear system. The gear system includes a gear assembly having a shaft that is at least partially disposed within the housing of the gear system. A thrust bearing has inner and outer races with the outer race coupled to the housing. A bearing flexure is disposed between the inner race of the thrust bearing and the shaft. The bearing flexure includes a cylindrical cage having at least one shaft journal ring and a plurality of circumferentially distributed axially extending fingers coupled thereto with the shaft journal ring coupled to the shaft of the gear assembly. The bearing flexure also includes a cylindrical bearing journal having inner and outer surfaces with the outer surface coupled to the inner race of the thrust bearing. Each of a plurality of circumferentially distributed radially extending struts extends between one of the fingers and the inner surface of the cylindrical bearing journal. The bearing flexure has an axial stiffness that is greater than its radial stiffness.

In certain embodiments, the gear assembly may include an input gear. In other embodiments, the gear assembly may include an output gear. In some embodiments, the gear assembly may include a cylindrical gear such as a pinion gear, a helical gear, a spur gear, a bevel gear or a spiral bevel gear. In certain embodiments, a bearing system may include the thrust bearing, a first radial bearing having an inner race coupled to the shaft and a second radial bearing having an inner race coupled to the shaft. In such embodiments, the thrust bearing and the bearing flexure may be positioned between the first and second radial bearings. Also, in such embodiments, the bearing flexure may be configured to accommodate clearance in the first and second radial bearings such that radial loads are at least partially decoupled from the thrust bearing. In some embodiments, the thrust bearing may be in thermal communication with the housing. In certain embodiments, the thrust bearing may be a ball bearing assembly such as a duplex ball bearing assembly.

In some embodiments, the at least one shaft journal ring may include first and second shaft journal rings with the fingers axially extending between the first and second shaft journal rings. In other embodiments, the at least one shaft journal ring may be a single shaft journal ring. In certain embodiments, the fingers may have a one to one relationship with the struts. In some embodiments, the axial stiffness of the bearing flexure may be at least two times greater than the radial stiffness of the bearing flexure such as at least three times greater, at least seven times greater or at least ten times greater than the radial stiffness of the bearing flexure. For example, a ratio of the axial stiffness of the bearing flexure to the radial stiffness of the bearing flexure may be between 2 to 1 and 10 to 1. In certain embodiments, the gear system may be a main rotor gearbox of a rotorcraft. In other embodiments, the gear system may be a proprotor gearbox of a tiltrotor aircraft.

In a second aspect, the present disclosure is directed to a rotorcraft. The rotorcraft includes an engine and a gear system having a housing. The gear system includes an input gear assembly that provides torque and rotational energy to the gear system from the engine. The input gear assembly has a shaft that is at least partially disposed within the housing. A thrust bearing has inner and outer races with the outer race coupled to the housing. A bearing flexure is disposed between the inner race of the thrust bearing and the shaft of the input gear assembly. The bearing flexure includes a cylindrical cage having at least one shaft journal ring and a plurality of circumferentially distributed axially extending fingers coupled thereto with the shaft journal ring coupled to the shaft of the input gear assembly. The bearing flexure also includes a cylindrical bearing journal having inner and outer surfaces with the outer surface coupled to the inner race of the thrust bearing. Each of a plurality of circumferentially distributed radially extending struts extends between one of the fingers and the inner surface of the cylindrical bearing journal. The bearing flexure has an axial stiffness that is greater than its radial stiffness.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1B are schematic illustrations of a helicopter having a gear system in accordance with embodiments of the present disclosure;

DETAILED DESCRIPTION

Figure 2A:
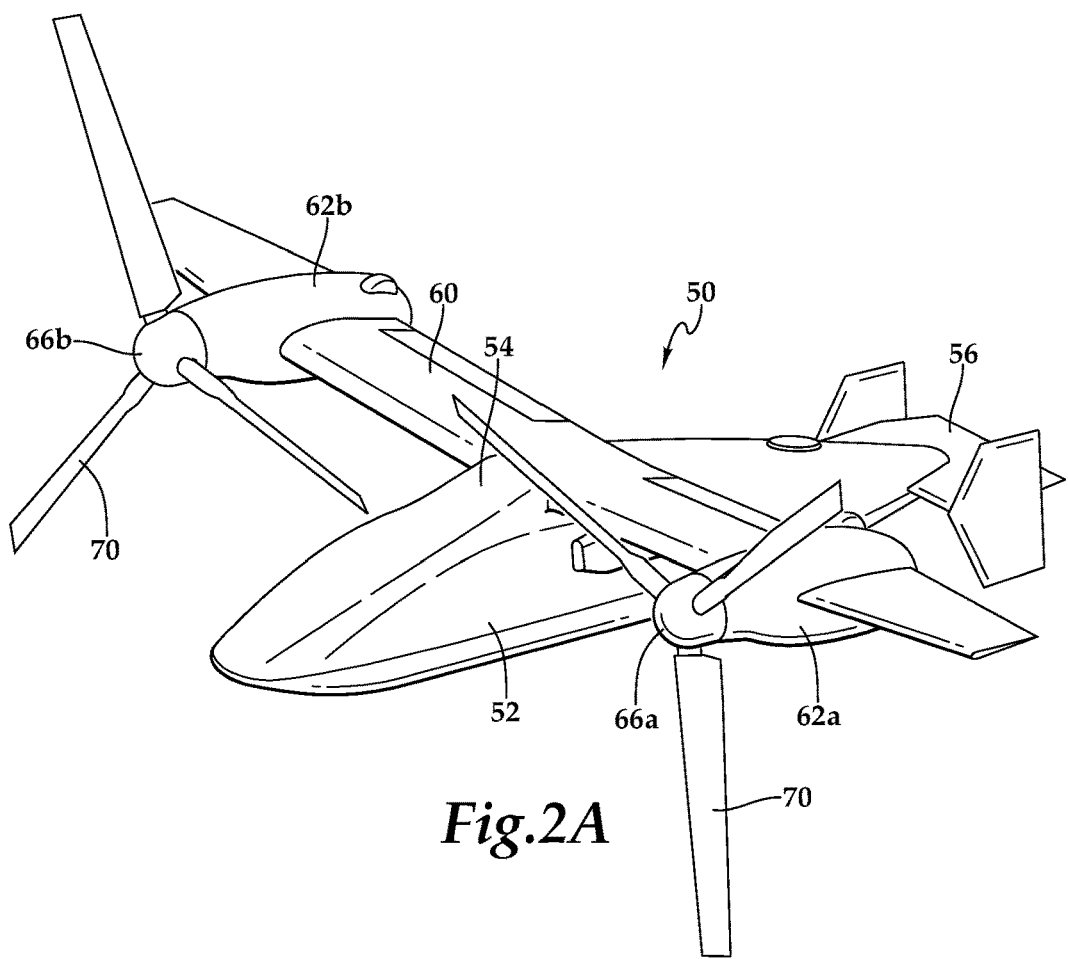
FIGS. 2A-2C are schematic illustrations of a tiltrotor aircraft having gear systems in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and nonmoving mechanical connections.

Referring now to FIGS. 1A-1B in the drawings, a rotorcraft depicted as helicopter is schematically illustrated and generally designated 10. Helicopter 10 includes a body depicted as fuselage 12 and tailboom 14. The primary propulsion for helicopter 10 is generated by a main rotor system 16. Main rotor system 16 includes a plurality of rotor blades 18 extending radially outward from a main rotor hub 20. The pitch of rotor blades 18 can be collectively and cyclically manipulated by a pitch control assembly, such as a rise and fall swashplate, to selectively control the direction, thrust and lift of helicopter 10. Main rotor system 16 receives torque and rotational energy from a powertrain that includes a mast 22, a main rotor gearbox 24 and one or more engines 26, such as turbo shaft engines. Main rotor gearbox 24 includes a gear system 28 including reducing gears designed to enable optimum engine speed and optimal rotor speed during flight operations. In the illustrated embodiment, a drive shaft 30 is coupled between engine 26 and main rotor gearbox 24 via an input gear assembly 32.

Helicopter 10 includes an anti-torque system depicted as tail rotor 34 that controls the yaw of helicopter 10 by counteracting the torque exerted on fuselage 12 by rotor system 16. In the illustrated embodiment, tail rotor 34 is mounted on a vertical tail fin 36 that provides stabilization to helicopter 10 during high speed forward flight. In addition, helicopter 10 includes horizontal stabilizers 38 that extend laterally from tailboom 14. Tail rotor 34 receives torque and rotational energy from the powertrain of helicopter 10. In the illustrated embodiment, a tail rotor drive shaft 40 is coupled between a tail rotor gearbox 42 and main rotor gearbox 24 via an output gear assembly 44. As discussed herein, input gear assembly 32 and output gear assembly 44 each including a pinion gear and a dedicated shaft. In the illustrated embodiment, the pinion gear is depicted as a bevel gear such as a spiral bevel gear or a helical gear. In other embodiments, a pinion gear of a gear assembly of the present disclosure could be a spur gear or other cylindrical gear. A landing gear system 46 provides ground support for helicopter 10.

Figure 2B:
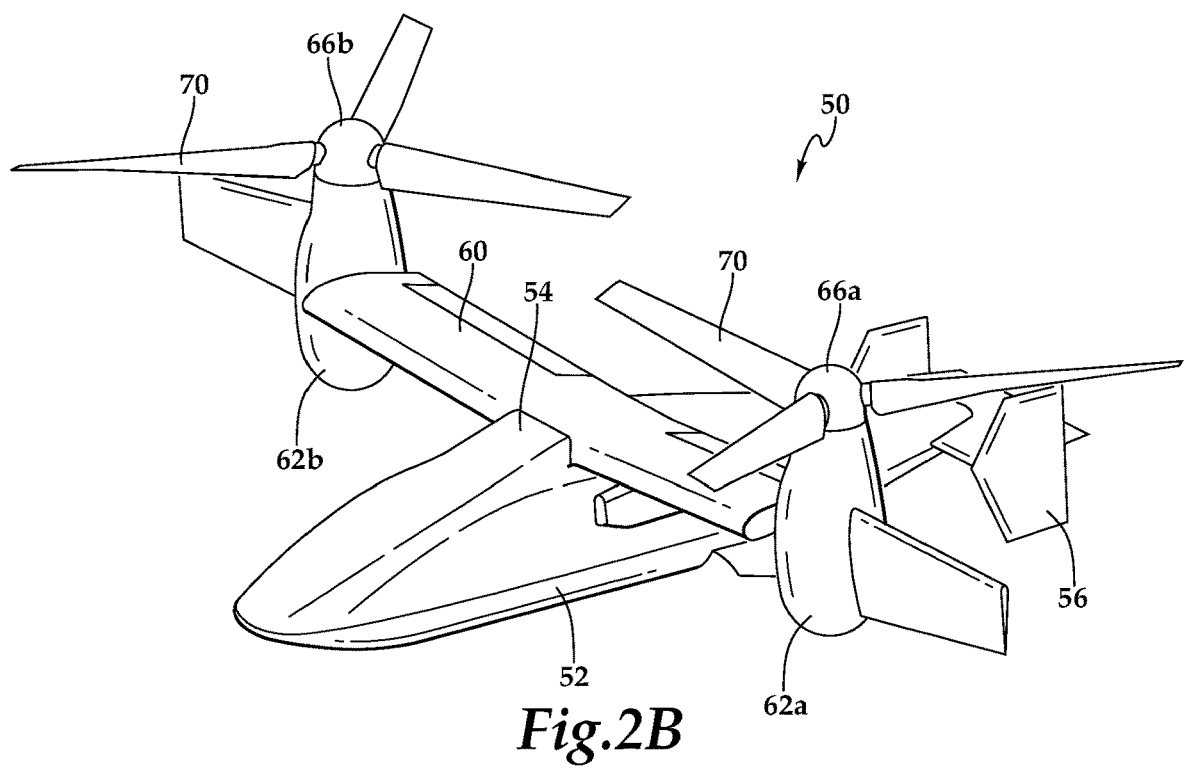
Figure 2C:
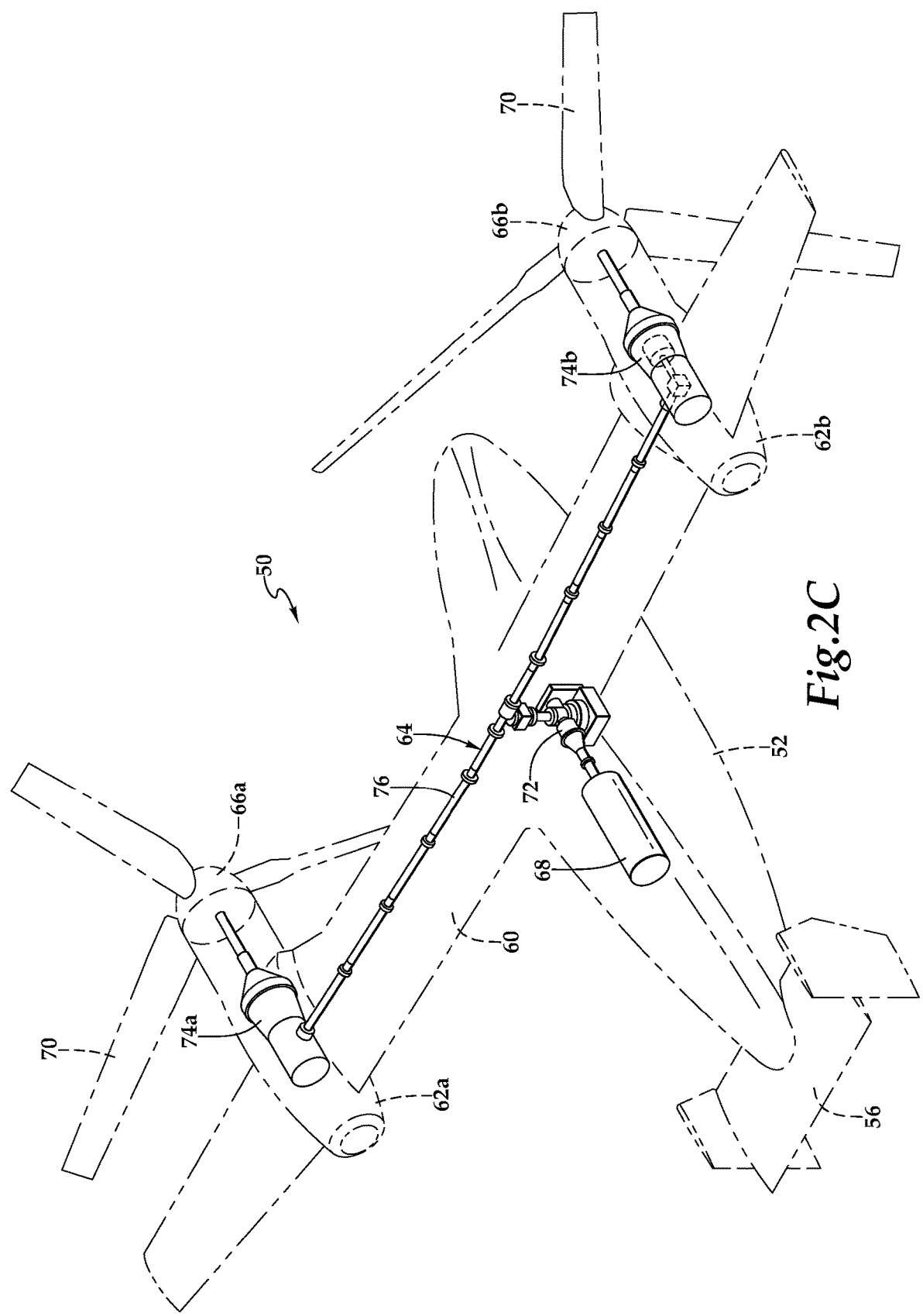

Referring now to FIGS. 2A-2C in the drawings, a tiltrotor aircraft is schematically illustrated and generally designated 50. Tiltrotor aircraft 50 includes a fuselage 52, a wing mount assembly 54 and a tail assembly 56. Tail assembly 56 may have control surfaces operable for horizontal and/or vertical stabilization during flight. A wing 60 is supported by fuselage 52 and wing mount assembly 54. Coupled to the outboard ends of wing 60 are pylon assemblies 62a, 62b. Pylon assembly 62a is rotatable relative to wing 60 between a generally horizontal orientation, as best seen in FIGS. 1A and 1C, and a generally vertical orientation, as best seen in FIG. 1B. Pylon assembly 62a includes a tiltable portion of a drivetrain 64 and a proprotor assembly 66a that is rotatable responsive to torque and rotational energy provided by an engine 68 that together with drivetrain 64 form the powertrain of tiltrotor aircraft 50. Likewise, pylon assembly 62b is rotatable relative to wing 60 between a generally horizontal orientation, as best seen in FIGS. 1A and 1C, and a generally vertical orientation, as best seen in FIG. 1B. Pylon assembly 62b includes a tiltable portion of drivetrain 64 and a proprotor assembly 66b that is rotatable responsive to torque and rotational energy provided by engine 68. In the illustrated embodiment, proprotor assemblies 66a, 66b each include three proprotor blade assemblies 70. The position of pylon assemblies 62a, 62b, the angular velocity or revolutions per minute (RPM) of proprotor assemblies 66a, 66b, the pitch of proprotor blade assemblies 70 and the like may be controlled by the pilot of tiltrotor aircraft 50 and/or a flight control system to selectively control the direction, thrust and lift of tiltrotor aircraft 50 during flight.

FIGS. 2A and 2C illustrate tiltrotor aircraft 50 in a forward flight mode or airplane flight mode, in which proprotor assemblies 66a, 66b are positioned to rotate in a substantially vertical plane and provide a forward thrust while a lifting force is supplied by wing 60 such that tiltrotor aircraft 50 flies much like a conventional propeller driven aircraft. FIG. 2B illustrates tiltrotor aircraft 50 in a vertical takeoff and landing (VTOL) flight mode or helicopter flight mode, in which proprotor assemblies 66a, 66b are positioned to rotate in a substantially horizontal plane and provide a vertical thrust such that tiltrotor aircraft 50 flies much like a conventional helicopter. During operation, tiltrotor aircraft 50 may convert from helicopter flight mode to airplane flight mode following vertical takeoff and/or hover.

Likewise, tiltrotor aircraft 50 may convert back to helicopter flight mode from airplane flight mode for hover and/or vertical landing. In addition, tiltrotor aircraft 50 can perform certain flight maneuvers with proprotor assemblies 66a, 66b positioned between airplane flight mode and helicopter flight mode, which can be referred to as conversion flight mode.

The powertrain of tiltrotor aircraft 50 includes engine 68 and drivetrain 64 that includes primary gearbox 72, proprotor gearboxes 74a, 74b and the various coupling therebetween including driveshaft 76 located in wing 60. In the illustrated embodiment, engine 68 and primary gearbox 72 are located in fuselage 12. In other embodiments, an engine may be located in each of pylon assemblies 62a, 62b and may be tiltable therewith. The gear systems of primary gearbox 72 and proprotor gearboxes 74a, 74b may employ any type or combination of gears such as a spiral bevel gear, helical gear, coaxial helical inline gears, bevel helical gears, skew bevel helical gears, worm reduction gears, planetary gears, spur gears and/or other gear assemblies including input and output gear assemblies similar to input gear assembly 32 and/or output gear assembly 44 discussed herein.

Referring now to FIGS. 3A-3E in the drawings, various views of a gear assembly and related components are depicted. In the illustrated embodiment, gear assembly 100 includes a pinion gear 102, a dedicated shaft 104 and a flange 106. Pinion gear 102 is depicted as a bevel gear with a helical tooth pattern and can thus be referred to as a helical gear or a spiral bevel gear. In other embodiments, pinion gear 102 could be a spur gear or other cylindrical gear. As illustrated, pinion gear 102 is integral with shaft 104 which has a generally cylindrical profile. At the end opposite pinion gear 102, shaft 104 is coupled to flange 106 at a splined connection 108 to prevent relative rotation therebetween. Flange 106 may be coupled to a drive shaft or other suitable torque transmission component (not pictured) to provide an input torque to or receive an output torque from gear assembly 100. A nut 110 secures flange 106 to shaft 104. Gear assembly 100 is representative of input gear assembly 32 and output gear assembly 44 of helicopter 10 or similar gear assemblies in the drivetrains of helicopter 10 and tiltrotor aircraft 50. Even though gear assembly 100 has been described as being an input or output gear assembly for the drivetrain of an aircraft, it should be understood by those having ordinary skill in the art that a gear assembly of the present disclosure could be used as a component in a gear system other than as an input or output gear and could be used in a gear system operating in a non-aircraft implementation.

Gear assembly 100 is supported by housing 112 of the gear system to which gear assembly 100 is a part such as main rotor gearbox 24 of helicopter 10, primary gearbox 72 of tiltrotor aircraft 50 or proprotor gearboxes 74a, 74b of tiltrotor aircraft 50. In the illustrated embodiment, a bearing system is disposed between gear assembly 100 and housing 112 to enable gear assembly 100 to rotate relative to housing 112. The bearing system includes radial bearings 114, 116 and a thrust bearing 118 that are axially secured in place on shaft 104 by flange 106. Radial bearing 114 includes an inner race 114a that is coupled to and rotatable with shaft 104, an outer race 114b that is coupled to housing 112 and a plurality of roller elements disposed between inner race 114a and outer race 114b that are individually and collectively denoted as 114c. Roller elements 114c have a certain clearance within inner race 114a and outer race 114b to allow, for example, proper bearing operation and thermal expansion. Radial bearing 116 includes an inner race 116a that is coupled to and rotatable with shaft 104, an outer race 116b that is coupled to housing 112 and a plurality of roller elements disposed between inner race 116a and outer race 116b that are individually and collectively denoted as 116c. Roller elements 116c have a certain clearance within inner race 116a and outer race 116b to allow, for example, proper bearing operation and thermal expansion.

Figure 3A:
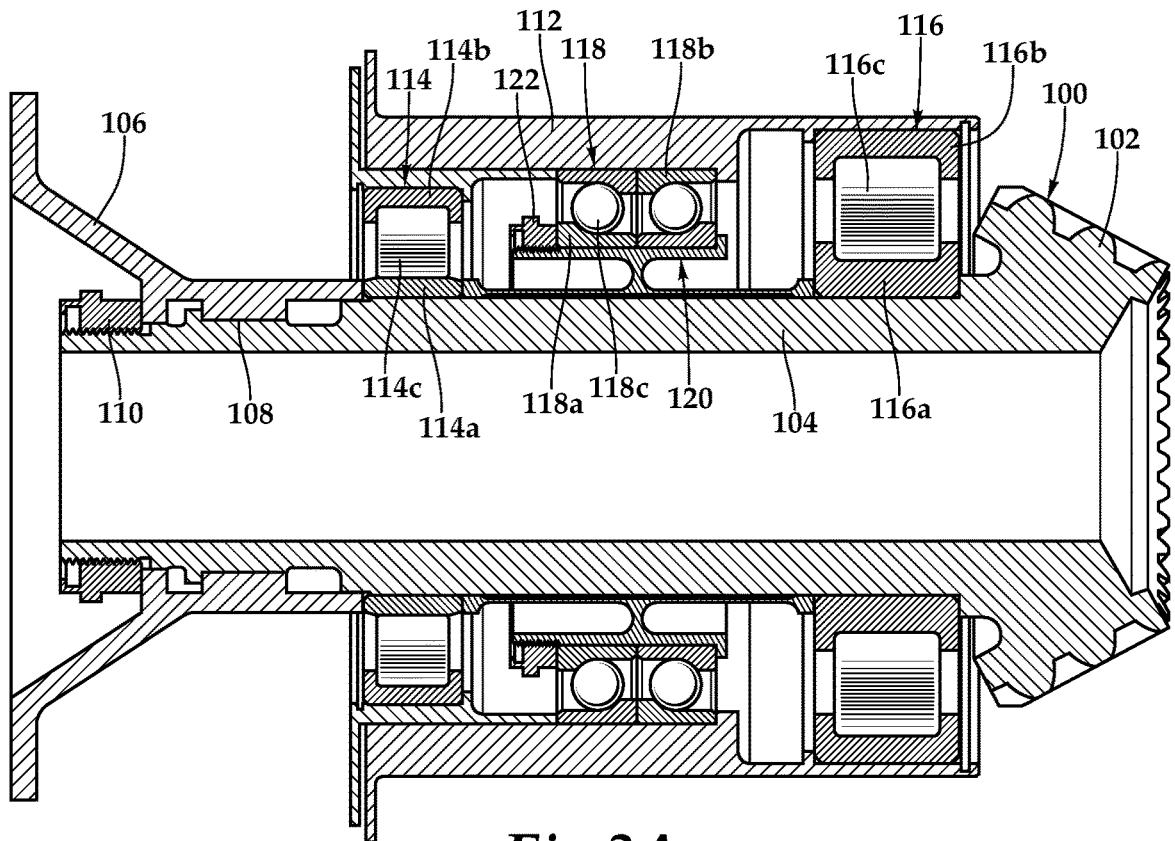
FIGS. 3A-3E are various views of a gear assembly and related components for a gear system in accordance with embodiments of the present disclosure.
Figure 3B:
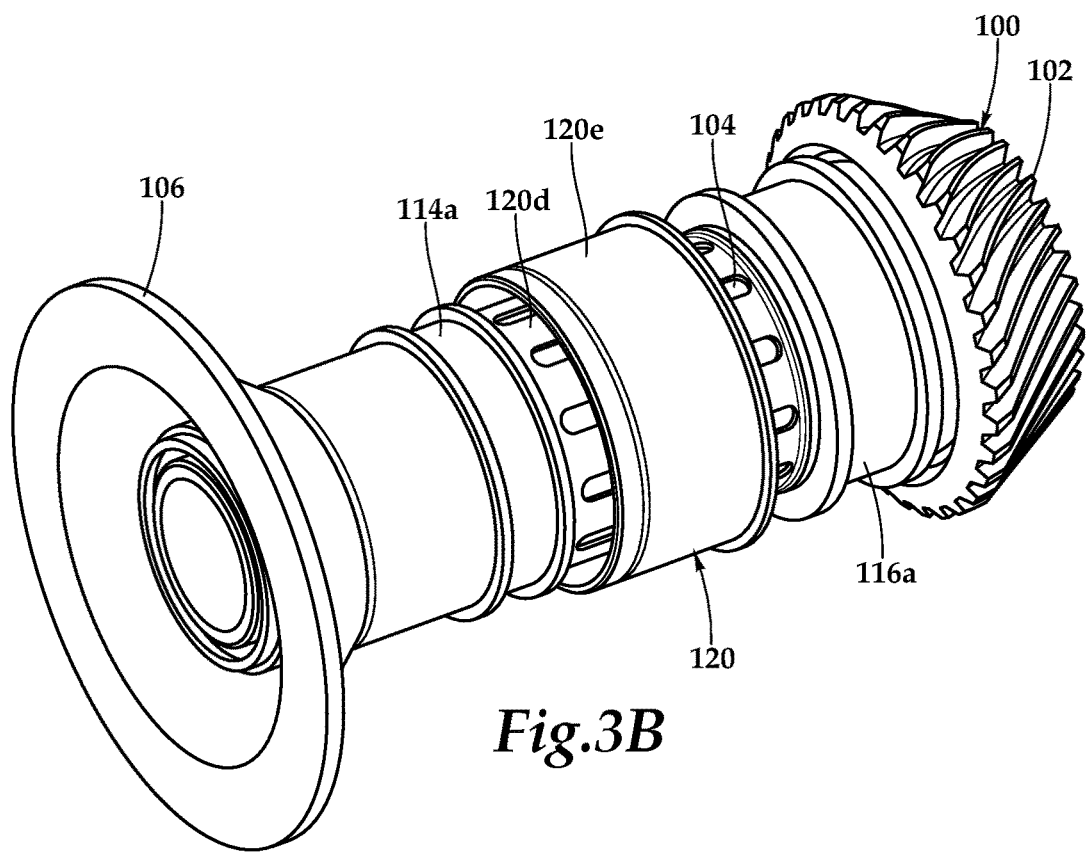
Figure 3C:
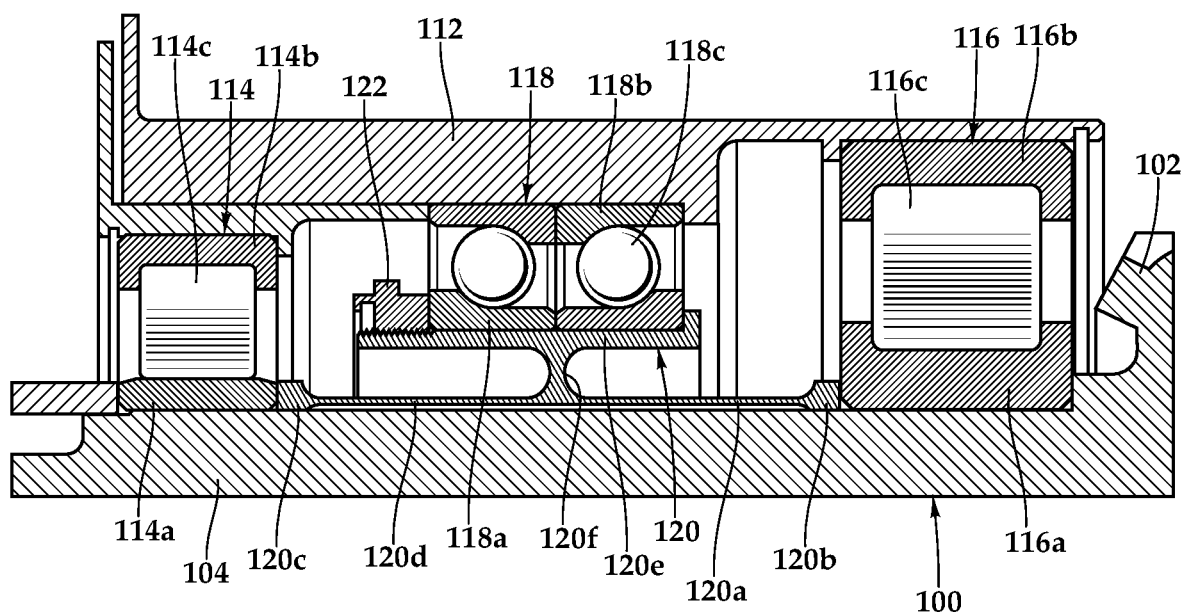
Figure 3D:
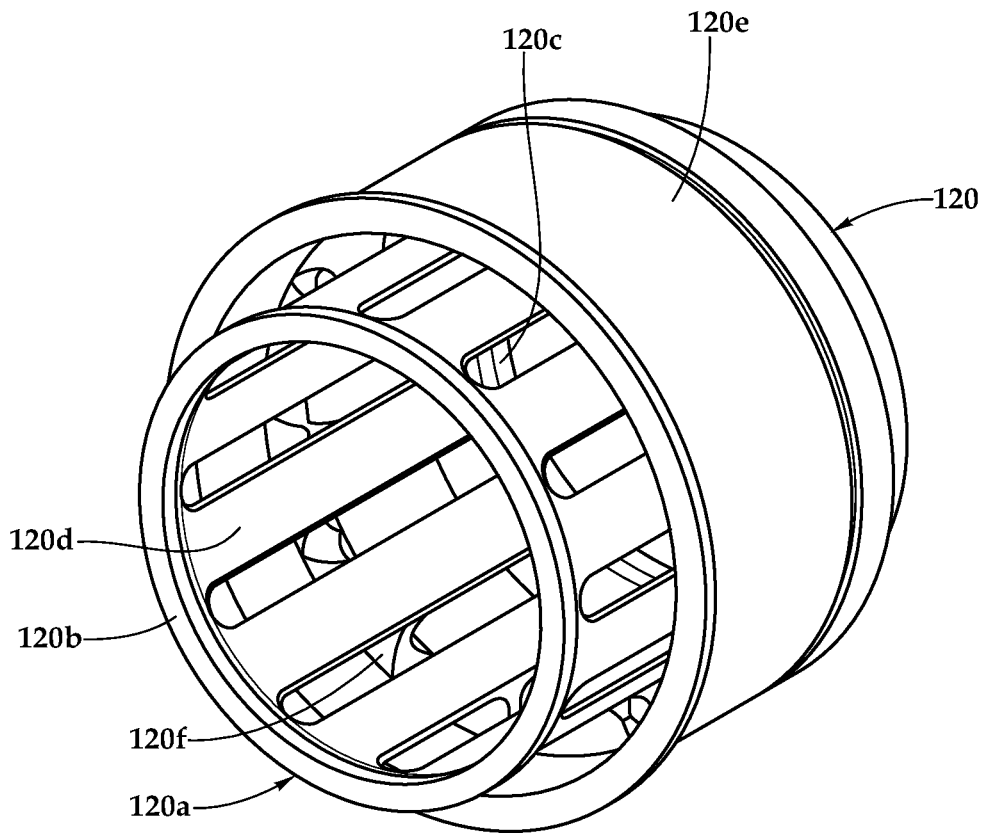
Figure 3E:
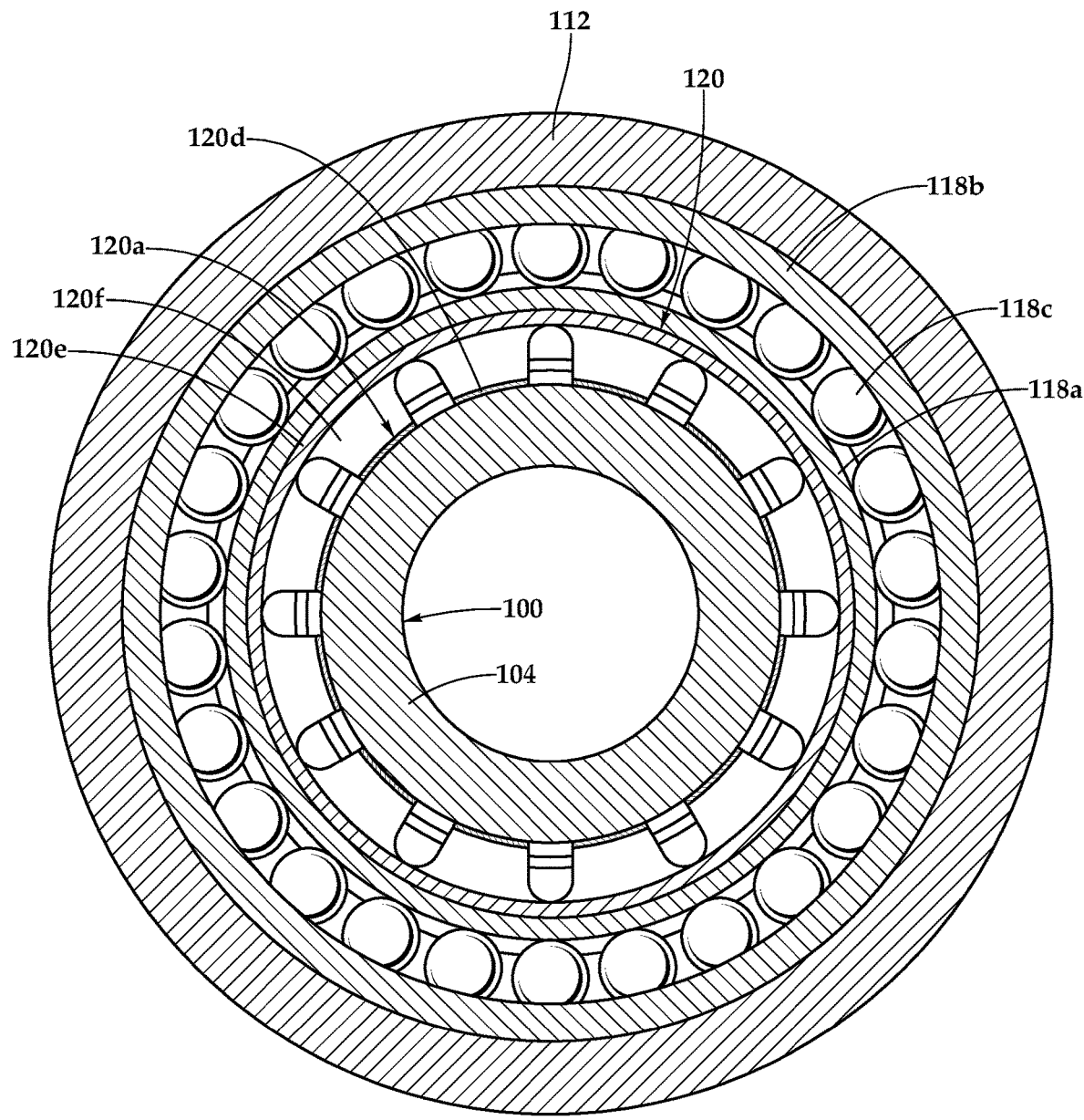

Thrust bearing 118 is positioned between radial bearings 114, 116. In the illustrated embodiment, thrust bearing 118 is a ball bearing assembly and more particularly a duplex ball bearing assembly. Thrust bearing 118 includes an inner race 118a, an outer race 118b that is coupled to housing 112 and a plurality of spherical elements disposed between inner race 118a and outer race 118b that are individually and collectively denoted as 118c. Preferably, spherical elements 118c are radially preloaded and thus have limited radial clearance. A bearing flexure 120 is positioned between thrust bearing 118 and shaft 104 and more particularly between inner race 118a of thrust bearing 118 and shaft 104. Bearing flexure 120 and inner race 118a of thrust bearing 118 are rotatable with shaft 104. As best seen in FIG. 3D, bearing flexure 120 includes a radially inwardly positioned cylindrical cage 120a having first and second shaft journal rings 120b, 120c and a plurality of circumferentially distributed axially extending fingers 120d coupled therebetween. Shaft journal rings 120b, 120c are coupled to shaft 104. Bearing flexure 120 also includes a radially outwardly positioned cylindrical bearing journal 120e, the outer surface of which is coupled to inner race 118a of thrust bearing 118 such that thrust bearing 118 is radially outwardly mounted on bearing flexure 120. Thrust bearing 118 is axially secured to bearing flexure 120 with a nut 122. Bearing flexure 120 further includes a plurality of circumferentially distributed radially extending struts 120f, each of which extends between one of the fingers 120d and the inner surface of cylindrical bearing journal 120e such that struts 120f and fingers 120d have a one to one relationship. Even though thrust bearing 118 and bearing flexure 120 have been depicted and described as being positioned between radial bearings 114, 116, it should be understood by those having ordinary skill in the art that a bearing system of the present disclosure could have alternate designs including designs in which a thrust bearing and bearing flexure are not positioned between two radial bearings, designs including other numbers of radial bearings both less than or greater than two and/or designs including other numbers of thrust bearings and bearing flexures in other configurations.

Bearing flexure 120 is preferably formed from a material having a high strength and a high endurance limit and may be a single integral component or formed from multiple discrete subcomponents. For example, bearing flexure 120 may be formed from a metal such as a steel including 4340 steel, titanium or other suitable metal. The geometry of bearing flexure 120 is optimizes such that bearing flexure 120 has an axial stiffness that is greater than its radial stiffness. In one example, the radial stiffness of bearing flexure 120 may be about 400,000 pounds per inch while the axial stiffness of bearing flexure 120 may be about 1,200,000 pounds per inch. In this example, the ratio of the axial stiffness to the radial stiffness of bearing flexure 120 is about 3 to 1. It will be understood by those having ordinary skill in the art that the absolute axial stiffness and the absolute radial stiffness as well as the ratio of the axial stiffness to the radial stiffness of bearing flexure 120 can be tailored to the specific implementation based upon material selection, the width, length and/or thickness of fingers 120d, the width, length and/or thickness of struts 120f, the number of fingers 120d and struts 120f as well as other specific design factors. For certain implementations, the axial stiffness of bearing flexure 120 may be at least two times greater than the radial stiffness of bearing flexure 120 such as at least three times greater, at least seven times greater, at least ten times greater or other suitable factor greater than the radial stiffness of bearing flexure 120. Stated as a ratio of the axial stiffness to the radial stiffness of bearing flexure 120, the stiffness ratio may be between 2 to 1 and 10 to 1 or greater.

Mounting thrust bearing 118 radially outwardly on bearing flexure 120 provides several advantage for the associated gear system. Specifically, the absolute axial stiffness, the absolute radial stiffness and/or the stiffness ratio can be tailored to accommodate proper clearance for roller elements 114c, 116c of radial bearings 114, 116 such that spherical elements 118c of thrust bearing 118 do not experience excessive radial loads and/or are decoupled from the radial loads. In addition, by locating bearing flexure 120 to the interior of thrust bearing 118, outer race 118b of thrust bearing 118 is in thermal communication with housing 112 which act as a heat sink to dissipate the heat generated by thrust bearing 118, thereby maintaining proper thrust bearing performance even during high speed operations.

Referring now to FIGS. 4A-4D in the drawings, various views of a gear assembly and related components are depicted. In the illustrated embodiment, gear assembly 200 includes a pinion gear 202, a dedicated shaft 204 and a flange 206. Pinion gear 202 is depicted as a spiral bevel gear. As illustrated, pinion gear 202 is integral with shaft 204 which has a generally cylindrical profile. At the end opposite pinion gear 202, shaft 204 is coupled to flange 206 at a splined connection 208 to prevent relative rotation therebetween. Flange 206 may be coupled to a drive shaft or other suitable torque transmission component (not pictured) to provide an input torque to or receive an output torque from gear assembly 200. A nut 210 secures flange 206 to shaft 204. Gear assembly 200 is representative of input gear assembly 32 and output gear assembly 44 of helicopter 10 or similar gear assemblies in the drivetrains of helicopter 10 and tiltrotor aircraft 50.

Gear assembly 200 is supported by housing 212 of the gear system to which gear assembly 200 is a part such as main rotor gearbox 24 of helicopter 10, primary gearbox 72 of tiltrotor aircraft 50 or proprotor gearboxes 74a, 74b of tiltrotor aircraft 50. In the illustrated embodiment, a bearing system is disposed between gear assembly 200 and housing 212 to enable gear assembly 200 to rotate relative to housing 212. The bearing system includes radial bearings 214, 216 and a thrust bearing 218 that are secured in place on shaft 204 by flange 206. Radial bearing 214 includes an inner race 214a that is coupled to and rotatable with shaft 204, an outer race 214b that is coupled to housing 212 and a plurality of roller elements disposed between inner race 214a and outer race 214b that are individually and collectively denoted as 214c. Radial bearing 216 includes an inner race 216a depicted as being integral with shaft 204, an outer race 216b that is coupled to housing 212 and a plurality of roller elements disposed between inner race 216a and outer race 216b that are individually and collectively denoted as 216c.

Figure 4A:
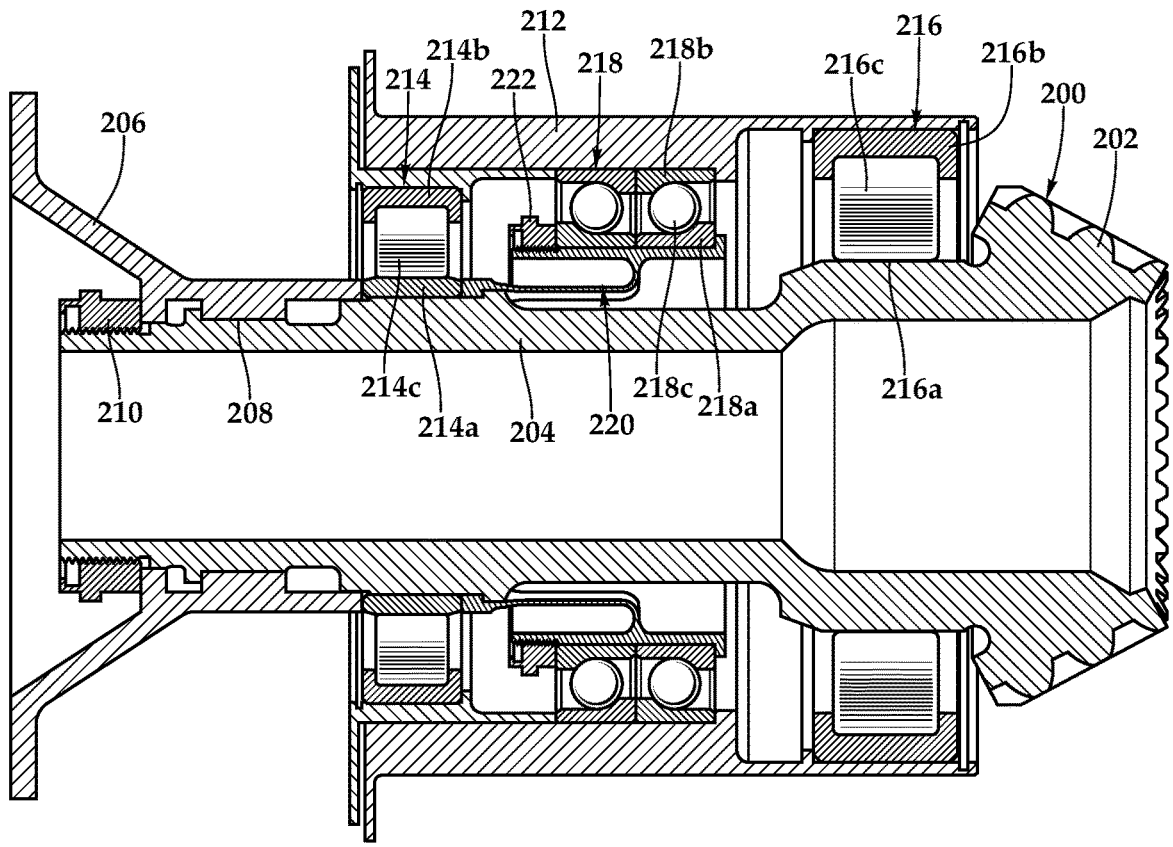
FIGS. 4A-4D are various views of a gear assembly and related components for a gear system in accordance with embodiments of the present disclosure.
Figure 4B:
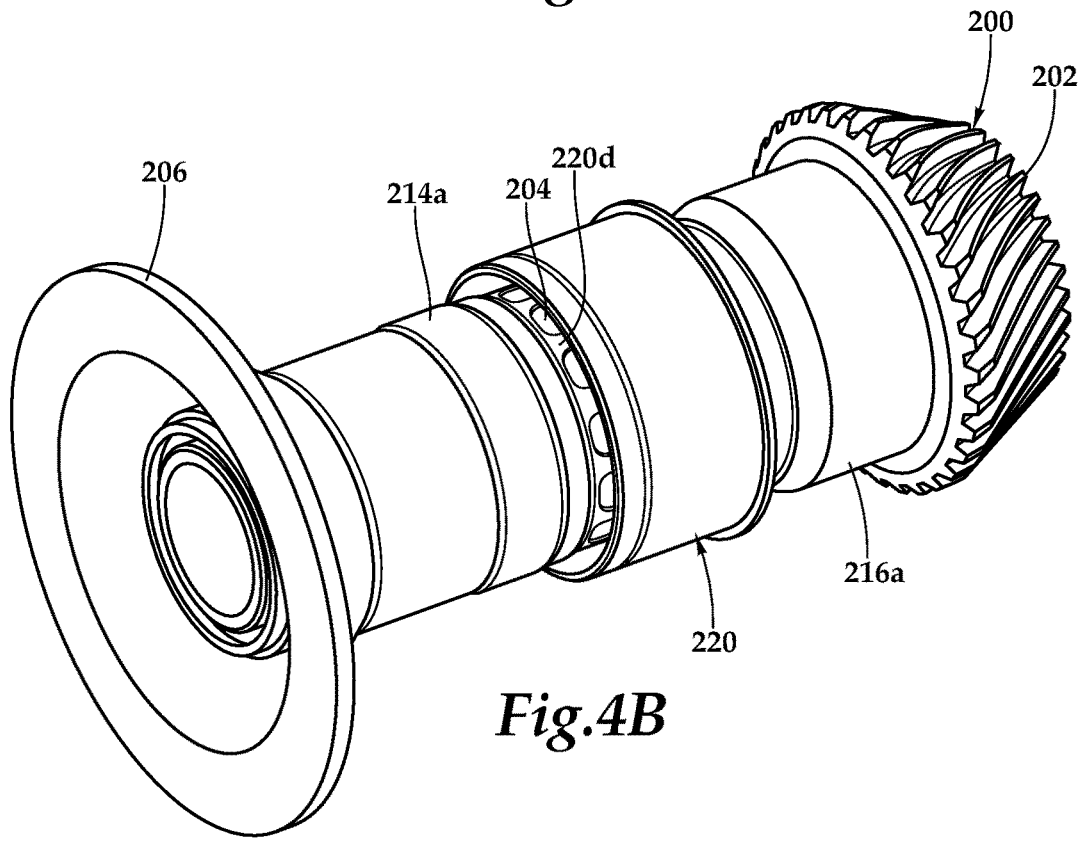
Figure 4C:
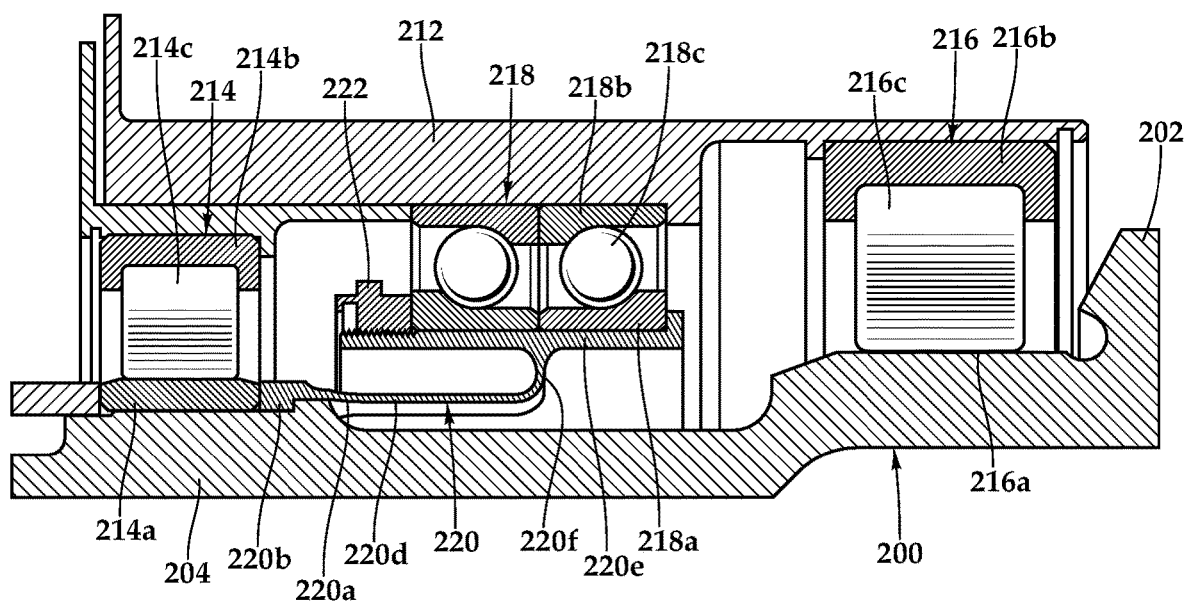
Figure 4D:
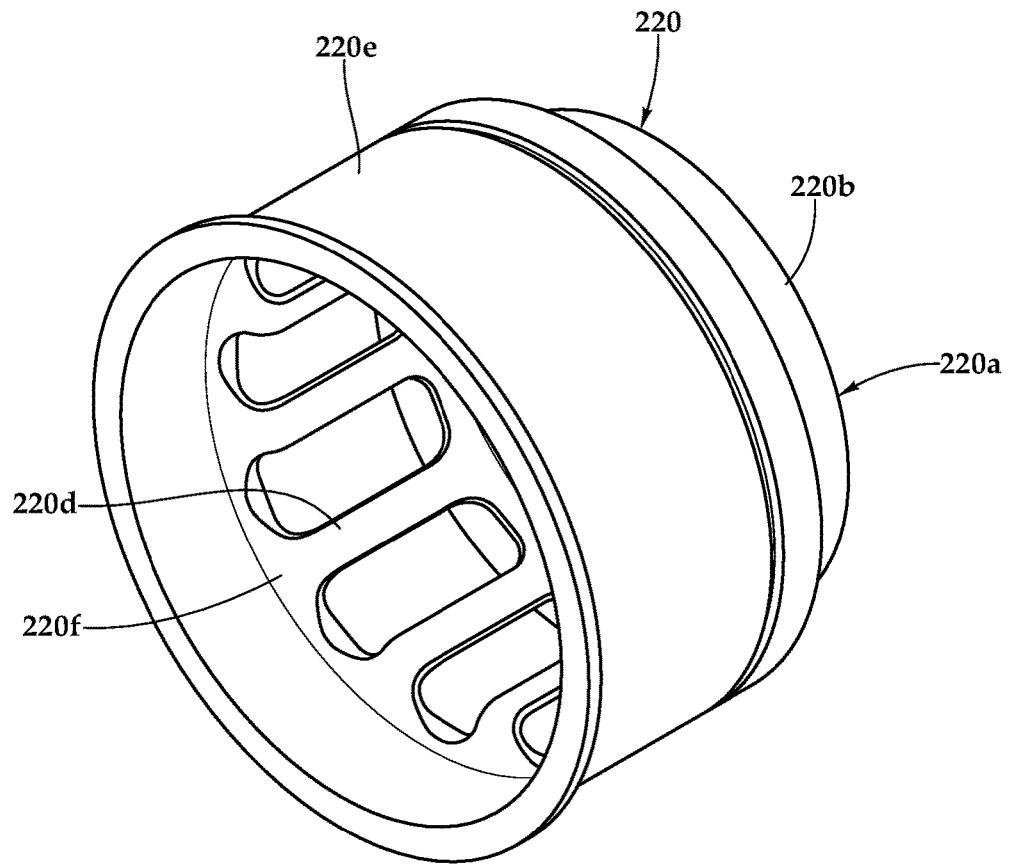

Thrust bearing 218 is positioned between radial bearings 214, 216. In the illustrated embodiment, thrust bearing 218 is a ball bearing assembly and more particularly a duplex ball bearing assembly. Thrust bearing 218 includes an inner race 218a, an outer race 218b that is coupled to housing 212 and a plurality of spherical elements disposed between inner race 218a and outer race 218b that are individually and collectively denoted as 218c. A bearing flexure 220 is positioned between thrust bearing 218 and shaft 204 and more particularly between inner race 218a of thrust bearing 218 and shaft 204. Bearing flexure 220 and inner race 218a of thrust bearing 218 are rotatable with shaft 204. As best seen in FIG. 4D, bearing flexure 220 includes a radially inwardly positioned cylindrical cage 220a having a shaft journal ring 220b and a plurality of circumferentially distributed axially extending fingers 220d extending therefrom. Shaft journal ring 220b is coupled to shaft 204 and is secure in place by the abutment of radial bearing 214. Bearing flexure 220 also includes a radially outwardly positioned cylindrical bearing journal 220e, the outer surface of which is coupled to inner race 218a of thrust bearing 218 such that thrust bearing 218 is radially outwardly mounted on bearing flexure 220. Thrust bearing 218 is axially secured to bearing flexure 220 with a nut 222. Bearing flexure 220 further includes a plurality of circumferentially distributed radially extending struts 220f, each of which extends between one of the fingers 220d and the inner surface of cylindrical bearing journal 220e such that struts 220f and fingers 220d have a one to one relationship.

Bearing flexure 220 is preferably formed from a material having a high strength and a high endurance limit and may be a single integral component or formed from multiple discrete subcomponents. The geometry of bearing flexure 220 is optimizes such that bearing flexure 220 has an axial stiffness that is greater than its radial stiffness. In one example, the radial stiffness of bearing flexure 220 may be about 100,000 pounds per inch while the axial stiffness of bearing flexure 220 may be about 700,000 pounds per inch. In this example, the ratio of the axial stiffness to the radial stiffness of bearing flexure 220 is about 7 to 1. It will be understood by those having ordinary skill in the art that the absolute axial stiffness and the absolute radial stiffness as well as the ratio of the axial stiffness to the radial stiffness of bearing flexure 220 can be tailored to the specific implementation based upon material selection, the width, length and/or thickness of fingers 220d, the width, length and/or thickness of struts 220f, the number of fingers 220d and struts 220f as well as other specific design factors. For certain implementations, the axial stiffness of bearing flexure 220 may be at least two times greater than the radial stiffness of bearing flexure 220 such as at least three times greater, at least seven times greater, at least ten times greater or other suitable factor greater than the radial stiffness of bearing flexure 220. Stated as a ratio of the axial stiffness to the radial stiffness of bearing flexure 220, the stiffness ratio may be between 2 to 1 and 10 to 1 or greater.

Mounting thrust bearing 218 radially outwardly on bearing flexure 220 provides several advantage for the associated gear system. Specifically, the absolute axial stiffness, the absolute radial stiffness and/or the stiffness ratio can be tailored to accommodate proper clearance for roller elements 214c, 216c of radial bearings 214, 216 such that spherical elements 218c of thrust bearing 218 do not experience excessive radial loads and/or are decoupled from the radial loads. In addition, by locating bearing flexure 220 to the interior of thrust bearing 218, outer race 218b of thrust bearing 218 is in thermal communication with housing 212 which act as a heat sink to dissipate the heat generated by thrust bearing 218, thereby maintaining proper thrust bearing performance even during high speed operations.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A gear system having a housing, the gear system comprising:
    a gear assembly having a shaft that is at least partially disposed within the housing;
    a thrust bearing having inner and outer races, the outer race coupled to the housing; and
    a bearing flexure disposed between the inner race of the thrust bearing and the shaft, the bearing flexure including:
        a cylindrical cage having at least one shaft journal ring and a plurality of circumferentially distributed axially extending fingers coupled thereto, the shaft journal ring coupled to the shaft;
        a cylindrical bearing journal having inner and outer surfaces, the outer surface coupled to the inner race of the thrust bearing; and
        a plurality of circumferentially distributed radially extending struts, each strut extending between one of the fingers and the inner surface of the cylindrical bearing journal;
    wherein, an axial stiffness of the bearing flexure is greater than a radial stiffness of the bearing flexure.

2. The gear system as recited in claim 1 wherein the gear assembly further comprises an input gear.

3. The gear system as recited in claim 1 wherein the gear assembly further comprises an output gear.

4. The gear system as recited in claim 1 wherein the gear assembly further comprises a cylindrical gear selected from the group consisting of pinion gears, helical gears, spur gears, bevel gears and spiral bevel gears.

5. The gear system as recited in claim 1 further comprising a bearing system including the thrust bearing, a first radial bearing having an inner race coupled to the shaft and a second radial bearing having an inner race coupled to the shaft;
    wherein, the thrust bearing and the bearing flexure are positioned between the first and second radial bearings; and
    wherein, the bearing flexure is configured to accommodate clearance in the first and second radial bearings such that radial loads are at least partially decoupled from the thrust bearing.

6. The gear system as recited in claim 1 wherein the thrust bearing is in thermal communication with the housing.

7. The gear system as recited in claim 1 wherein the thrust bearing is a duplex ball bearing assembly.

8. The gear system as recited in claim 1 wherein the at least one shaft journal ring comprises first and second shaft journal rings and wherein the fingers axially extend between the first and second shaft journal rings.

9. The gear system as recited in claim 1 wherein the at least one shaft journal ring is a single shaft journal ring.

10. The gear system as recited in claim 1 wherein the fingers have a one to one relationship with the struts.

11. The gear system as recited in claim 1 wherein the axial stiffness of the bearing flexure is at least two times greater than the radial stiffness of the bearing flexure.

12. The gear system as recited in claim 1 wherein the axial stiffness of the bearing flexure is at least three times greater than the radial stiffness of the bearing flexure.

13. The gear system as recited in claim 1 wherein the axial stiffness of the bearing flexure is at least seven times greater than the radial stiffness of the bearing flexure.

14. The gear system as recited in claim 1 wherein the axial stiffness of the bearing flexure is at least ten times greater than the radial stiffness of the bearing flexure.

15. The gear system as recited in claim 1 wherein a ratio of the axial stiffness of the bearing flexure to the radial stiffness of the bearing flexure is between 2 to 1 and 10 to 1.

16. The gear system as recited in claim 1 wherein the gear system is a main rotor gearbox of a rotorcraft.

17. The gear system as recited in claim 1 wherein the gear system is a proprotor gearbox of a tiltrotor aircraft.

18. A rotorcraft comprising:
    an engine; and
    a gear system having a housing, the gear system including:
        an input gear assembly providing torque and rotational energy to the gear system from the engine, the input gear assembly having a shaft that is at least partially disposed within the housing;
        a thrust bearing having inner and outer races, the outer race coupled to the housing; and
        a bearing flexure disposed between the inner race of the thrust bearing and the shaft, the bearing flexure including:
            a cylindrical cage having at least one shaft journal ring and a plurality of circumferentially distributed axially extending fingers coupled thereto, the shaft journal ring coupled to the shaft;
            a cylindrical bearing journal having inner and outer surfaces, the outer surface coupled to the inner race of the thrust bearing; and
            a plurality of circumferentially distributed radially extending struts, each strut extending between one of the fingers and the inner surface of the cylindrical bearing journal;
        wherein, an axial stiffness of the bearing flexure is greater than a radial stiffness of the bearing flexure.

19. The rotorcraft as recited in claim 18 wherein the gear system is a main rotor gearbox.

20. The rotorcraft as recited in claim 18 wherein the gear system is a proprotor gearbox.

* * * * *